Aug. 11, 1964    C. H. SAVIT ETAL    3,144,651
TIME-SCALE RECORDING APPARATUS
Filed Aug. 31, 1962    3 Sheets-Sheet 3
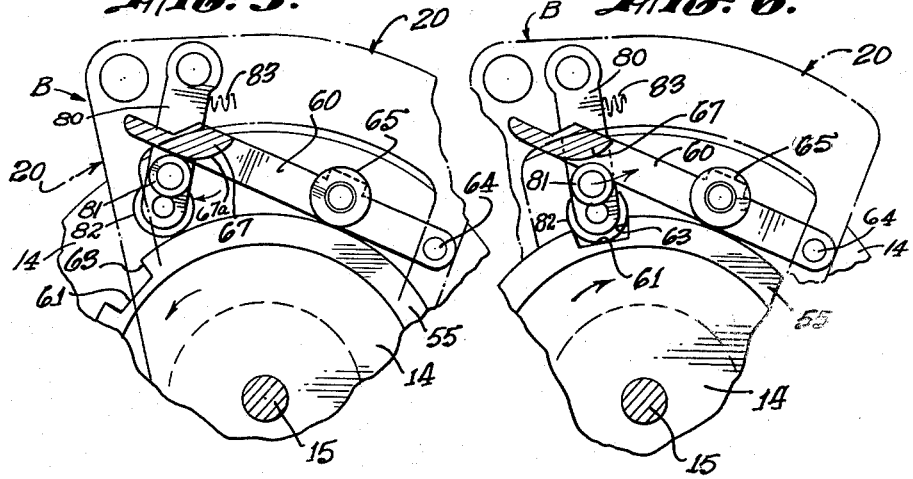
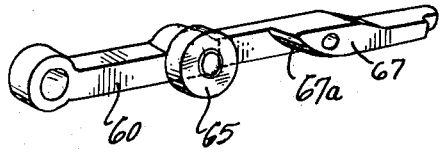
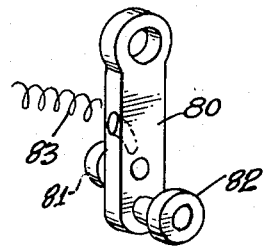
CARL H. SAVIT,
MELVIN J. WELLS,
INVENTORS.
BY THEIR ATTORNEYS.
Spensley & Horn.

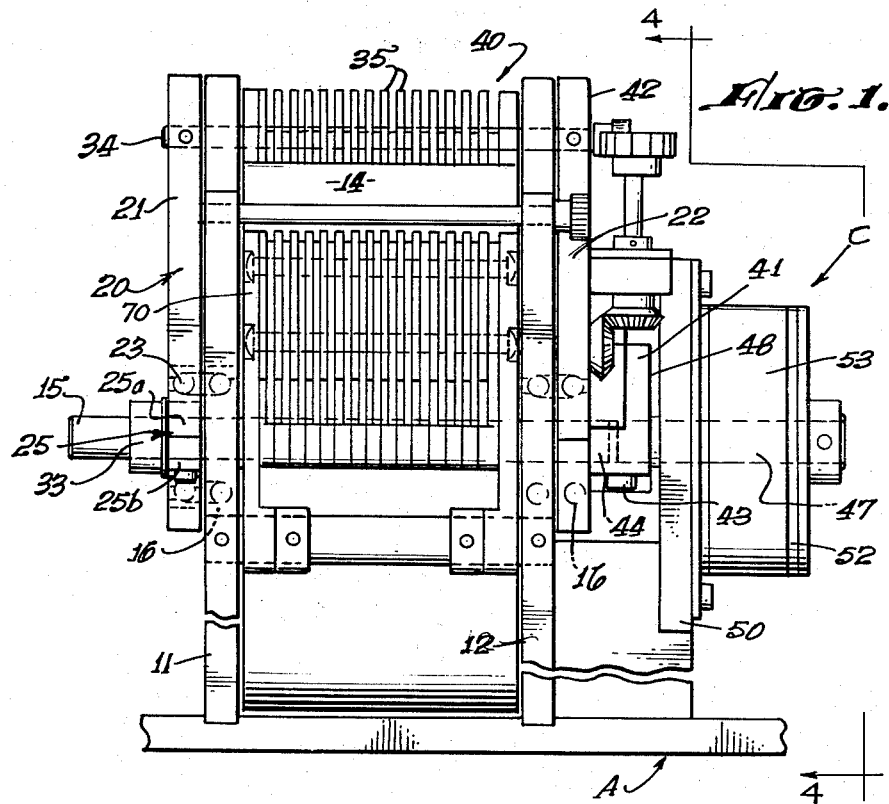

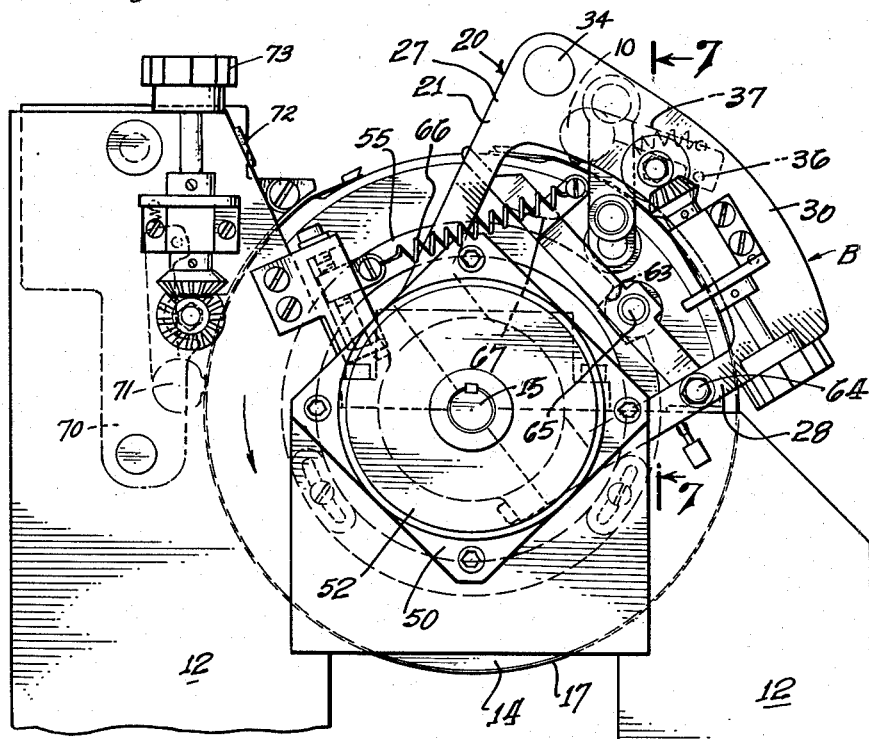

United States Patent Office 3,144,651
Patented Aug. 11, 1964

3,144,651
TIME-SCALE RECORDING APPARATUS
Carl H. Savit, Van Nuys, and Melvin J. Wells, Torrance, Calif., assignors to Western Geophysical Company of America, Los Angeles, Calif., a corporation of Delaware
Filed Aug. 31, 1962, Ser. No. 220,720
16 Claims. (Cl. 346—74)

This invention relates to recording apparatus and more particularly to an improved apparatus for recording and synchronizing a plurality of input signals.

In its broader aspects, the present invention provides means for commencing the recordation of an external signal at a fixed point on a moving recording medium, and more particularly provides for the commencement, at a predetermined point on a moving recording medium, of recordation of an external signal indicative of the occurrence of a second event which follows by an undetermined length of time the occurrence of a first event.

Under various circumstances in the recordation of input signals to form a time-scale record of such signals, it is necessary or expedient to commence the recordation of the signal at a fixed position on the recording medium or to synchronize a plurality of such signals with respect to the fiducial point of each. For example, in making seismographic surveys by the so-called reflection method, a record is made of the earth waves produced at a given point by a shock initiated near the earth's surface at another point. In general, the record shows waves which have traversed paths close to the earth's surface and waves which have penetrated the earth and have been reflected by interfaces between two layers of different properties or characteristics. For purposes of illustration, in a common arrangement of seismograph exploratory and recording apparatus used for seismographic profiling work, a plurality of seismometer or detector groups are disposed in contact with the ground at both sides of the point from which a shock wave is generated. The electrical impulses produced by the detector groups are recorded by various recording methods known to the art to obtain time-scale records of the shock waves received at the detector groups. It is with the time-scale recordation of such signals that the present invention deals. One method for such time-scale recordation is by magnetic recording upon tapes or a magnetic drum.

In some types of time-scale recording, a particular problem is encountered in that it is necessary to add or composite a series or plurality of input signals to obtain a meaningful time-scale record. This is necessary, for example, in seismograph exploration systems wherein a low signal-to-noise ratio of the reflection signals is obtained. Since the noise is random, meaningful signals can be developed by repetitively generating the same reflection waves. Since the reflection signals are repetitive while the noise is random, the signal-to-noise ratio is increased if the records are added and a meaningful record is obtained. In order to add such records, the fiducial point indicative of $T=0$ (where T is the time measured from a particular event) for each record, must be common to each of the other records. For example, on a magnetic tape or drum where the commencement of the record is not visible, it is essential that the $T=0$ point of each of the records be at a common time-scale position on the tape or drum. That is, to add three records which have been recorded separately upon magnetic recording surfaces, it is necessary only to reproduce simultaneously the three records with aligned reading heads. In order to do this, however, the three records must be aligned such that the $T=0$ point of each record occurs at the same time-scale location on the tape. In the prior state-of-the-art, no feasible means is available for commencing the recordation of an external signal at a fixed point on a recording medium such as a tape or drum.

By method and apparatus of the prior art, it is necessary to read or measure the time elapse from the beginning of the tape, or a marker on the tape or drum, to determine $T=0$ for each track and then to move the reading heads accordingly to effect synchronization. This is a time-consuming operation if not done automatically and if it is done automatically the apparatus necessary is very complex.

To illustrate further the utility and application of such apparatus, when the shock is generated by a cap and fuse rather than electrically detonated, the time of detonation cannot be accurately predetermined in that the burning time of the fuse will vary. Similarly, it is difficult to accurately foretell the initiation time of certain systems used in underwater exploration such as pneumatic acoustic sources. In such applications, the variation in fuse burning time alone, or mechanical train time in pneumatic sources, can easily amount to 10 to 15 milliseconds from one shot to the next, while an accuracy in the time-scale alignment of a plurality of records must be of the order of 1 millisecond. The signal identifying the shock time, $T=0$ of the system is supplied in cap and fuse systems by shock sensitive means such as a seismic "uphole" detector. In a field recording of the signals received from the detectors in which the present invention is utilized to commence the recording of the time-scale records at $T=0$, the recording would commence at the fiducial time signalled by the receipt of a signal from the uphole detector indicating the initiation of the shock wave. If the original, non-aligned time-scale recordings are made in the field, the present invention is particularly applicable to the alignment of the fiducial point of a plurality of signals when the signals are re-recorded.

Accordingly, it is an object of the present invention to provide an improved recording apparatus whereby the recordation of a signal can be commenced at a fixed or predetermined point on a moving recording medium.

It is another object of the present invention to provide an improved recording apparatus whereby the fiducial point in a plurality of sequentially recorded time-scale records can be aligned at a common time-scale position on the recording medium.

It is a further object of the present invention to provide an improved recording apparatus wherein time-scale recordation of a signal is initiated at a fixed time-origin point on recording medium.

Another object of the present invention is to provide an improved method and apparatus for recording a time-varying signal having a time origin corresponding to the occurrence of a second event, which second event occurs at a time subsequent to the occurrence of a first event such that movement of the recording medium is begun upon the occurrence of the first event and recordation is begun at a predetermined position on the recording medium upon the occurrence of the second event. It should be noted that in types of recording such as those utilizing a rotating drum, it is difficult to begin the rotation of the drum at the time recordation is desired because of the large inertial forces present. By means of the present invention, however, the proper recording speed between the recording medium and reproducing element is achieved instantaneously.

The present invention comprises a movable recording medium, means for positioning a reproducing element adjacent the recording medium at a predetermined point on the recording medium, the reproducing element being of the type which reproduces the signal by movement relative to the recording medium, means for moving the recording medium and reproducing element such that no relative movement occurs therebetween, and means for commencing relative movement between the recording medium and reproducing element upon receipt of an external signal.

The novel features which are believed to be characteristic of the invention, both as to its organization and method of operation together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawings:

FIGURE 1 is a view in elevation of a presently preferred embodiment of the present invention;

FIGURE 2 is a partial schematic view of the apparatus of FIGURE 1 showing the apparatus at a first condition of operation;

FIGURE 3 is a view corresponding to FIGURE 2 showing the apparatus at the second condition of operation;

FIGURE 4 is a view in elevation taken along line 4—4 of FIGURE 1; and,

FIGURE 5 is a partial detailed view of the apparatus corresponding to FIGURE 4 in a second condition to that of the apparatus in FIGURE 4;

FIGURE 6 is a view similar to FIGURE 5 in a third condition of operation;

FIGURE 7 is a partial view in section taken along line 7—7 of FIGURE 4;

FIGURE 8 is a fragmentary view in perspective of the detent arm of the present invention; and, FIGURE 9 is a fragmentary view in perspective of the cam bar of the apparatus.

Referring now to the drawings, there is shown a presently preferred embodiment of the present invention as adapted to a multi-channel magnetic recorder of the type which utilizes a rotating drum to which is affixed a magnetic tape. As discussed hereinbefore, although the present invention has many applications, it is particularly suitable to the recordation of detector signals received in seismographic exploration work and will accordingly be described in connection therewith as an illustrative example of the utility of the present invention. The apparatus shown in the drawings is suitable for original field recording wherein the signals from the seismic detector groups are transmitted directly to the recording heads in the recording apparatus or to re-recording applications wherein an original field recording of the detector signals is re-recorded with suitable corrections. In connection with the present invention in its illustrative embodiment, the operation of the apparatus will be described in connection with recording wherein the apparatus is receiving the seismic detector signals from previously recorded field tapes. When it is necessary to utilize weak explosions, or for other reasons the signal-to-noise ratio is low, it is advantageous to add a plurality of recorded signals as previously discussed to increase the signal-to-noise ratio. Accordingly, in an illustrative procedure, three shocks would be initiated at substantially the same shock point and three field records would be made. When cap and fuse are used to detonate a seismic shot instead of electrical means, as a safety precaution, for example, when operating near radio transmitters, the recording apparatus can be energized at the time the fuse train is lighted but the explosion will occur at a subsequent time which varies owing to the burning time of the fuse. Thus, rotation of the recording drum is commenced at the occurrence of a first event, i.e., the lighting of the fuse. The second event, i.e. the detonation, occurs at an unknown subsequent time and is the fiducial or $T=0$ time of the record. This will appear on the recording medium as a time-break signal recorded in a time-break channel as a signal from the uphole detector. A multi-channel field recording is obtained with a separate channel being recorded for each of the input signals, i.e., each of the detector groups transmits a signal to a respective one of said recording heads in the recording apparatus, which heads are arranged in side-by-side relationship to record the plurality of detector signals in a corresponding plurality of channels upon the magnetic recording tape. A typical number of channels to be recorded in each field recording would be 24. The three multitrace field recordings are then added by the apparatus of the present invention to add three sequential signals from each of the plurality of detectors in the field set-up. Thus, the recording apparatus of the present invention as shown in the drawings will utilize 72 recording heads, in the form of 24 three-channel heads, although substantially fewer are shown for clarity in the drawings.

Upon re-recordation of the first field tape, channels $1a$, $2a$, $3a$ . . . $24a$ will be recorded. Recordation of the second field tape will take place in channels $1b$, $2b$, $3b$ . . . $24b$ and of the third field tape in $1c$, $2c$, $3c$ . . . $24c$. It can therefore be seen that when the three re-recordings are accurately aligned with respect to the $T=0$ time of each, channels $1a$, $1b$ and $1c$; $2a$, $2b$ and $2c$; $3a$, $3b$ and $3c$; etc. can be added by utilizing aligned reading heads to read and add each group of signals. That is, $1a$, $1b$ and $1c$ are read, transmitted through additive circuitry and recorded as a single composite trace on a visual time-scale record, for example. For clarity of description, only one reproducing head will be described in connection with the recording made by the apparatus, it being understood that any number of heads could be utilized or that any number of recordings could be made by a single head. Various mechanical portions of the recording apparatus as well as the electrical circuitry and connections, all of which form no part of the present invention, are not shown in the drawings. To the contrary, the drawings illustrate only those portions of the recording apparatus which are a part of, or which are necessary to the understanding of, the present invention and omit all of those portions of the recording apparatus which are well known to the art. In general, the recording apparatus as shown in the drawings includes a frame or chassis A including a base with upright support members 11 and 12 which are spaced apart and between which is mounted a rotatable drum 14 upon a shaft 15. The shaft is rotatably affixed to the upright support members 11 and 12 by suitable bearing means 16. The drum is of the type to which a magnetic tape 17 can be affixed.

In accordance with the present invention, there is mounted upon the shaft 15 a recording head-rack yoke 20. The yoke 20 includes spaced apart yoke arms 21 and 22 which are spaced apart by a distance greater than the longitudinal length of the drum and the vertical support members 11 and 12. The yoke arms 21 and 22 include a bearing means 23 which is rotatably mounted upon the shaft 15 such that the yoke 20 is rotatable about the common axis of the drum 14. In the presently preferred embodiment as shown in FIGURES 1 and 4 and schematically in FIGURES 2 and 3, each yoke arm comprises a central member transverse to the axis through the shaft and defining a bearing surface having a diameter substantially equal to the diameter of the shaft 15. The central portion 25 in this embodiment is formed in two halves $25a$ and $25b$ which define semi-cylindrical bearing surfaces which are mateable and connected by bolts in order that the yoke member can be rotatably mounted upon the shaft 15. Various types of rotatable bearings can be utilized, but ball bearings of the conventional type, including inner and outer races with ball bearings therebetween, are used in this embodiment. Extending outwardly toward the circumference of the drum 14 are radially spaced apart radial members 27 and 28. The radial members 27 and 28 are interconnected by an arcuate outer member 30 which has an inner surface 31 positioned outwardly of the circumference of the drum 14. As will be seen, the configuration of the yoke is not critical and is formed as shown in the presently preferred embodiment primarily to conserve weight and for ease of construction. The two yoke arms 21 and 22 are substantially similar. The yoke arm 21 hereinafter referred to as the outer yoke arm is maintained in its longitudinal position upon the shaft 15 by a flanged sleeve 33. The yoke arms 21 and 22 are interconnected and formed into a single movable unit by cross members such as the rod 34 at one upper edge of the outer members. The connecting member 34 also serves as a bumper to limit the extent of travel of the yoke as described hereinafter. The rod 34 is, of course, spaced at a radius substantially greater than the radius of the drum 14 and from the foregoing it can be seen that the yoke assembly is freely movable with respect to the drum and is rotatable on the shaft 15 with respect to both the shaft and the drum.

A magnetic head mounting means is positioned between the yoke arms and is adapted to receive a plurality of magnetic heads such as recording heads 10 in a position for recordation upon a magnetic tape placed on the drum. As shown in FIGURES 1 and 4, the magnetic head mounting means are of a conventional type wherein a plurality of arcuate members are interconnected at each end. The arcuate members 35 are each spaced apart by a distance sufficient to accommodate a magnetic head therebetween and to position the magnetic head in the recording channel upon the magnetic tape carried by the drum. The magnetic heads are of the conventional type and are pivotally mounted between the arcuate members 35, as, for example, by a pin 36 connected at the rearward end of the arm 37 of the head. In this manner, the magnetic head is free to pivot downward and will contact the magnetic tape by its own weight. In the illustrative embodiment shown and in connection with which the operation of the present invention is to be described, recording heads are positioned such that a recording head is placed between each of the arcuate members 35 in the head mounting rack 40. A single head is shown for purposes of clarity. In FIGURES 2 and 3, two recording heads 10 are shown proximate each side of the moving head mounting means and the mounting rack 40 is omitted from these schematic figures. Thus, it can be seen that the yoke, the head mounting rack 40, and the plurality of recording heads mounted in the mounting rack are all movable as a unit and are rotatable about the shaft 15 of the magnetic drum. The sub-assembly which includes the yoke, mounting rack, and magnetic heads is termed the movable head mounting means B hereinafter.

Extending outwardly from the inner yoke arm 22, i.e., to the right in FIGURE 1 is the brake portion of the present invention. In general terms, this portion of the device is adapted to engage the movable head mounting means and to lock it into stationary position with respect to the chassis A of the recording device so that the drum will move relative to the movable head mounting means. In the embodiment shown, a bearing and interconnecting assembly 41 is affixed to the outer surface 42 of the yoke arm 22. This bearing assembly is again formed into portions which are interconnected and which define a bearing therein within which the shaft 15 of the drum can be rotatably positioned. The bearing assembly is connected to the yoke arm 22 by means such as bolts 43. The bearing assembly accordingly has an opening therethrough along the axis of the shaft 15 and the shaft 15 is of such length relative to the bearing assembly that it extends into the bearing assembly to a point approximately midway of the length of the bearing assembly. That is, the shaft 15 shown dotted in FIGURE 1 extends beyond the yoke arm 22 a substantial distance such that its outer end 44 terminates within the bearing assembly 41 and is rotatable therein. Thus, if the bearing assembly 41 is held stationary, the shaft 15 carrying the magnetic recording drum 14 is still free to rotate. A stub shaft 47 extends into the bearing assembly from the opposite side 48 thereof to a position juxtaposed to the outer end 44 of the shaft 15 but spaced therefrom. This stub shaft 47 is non-rotatable with respect to the bearing assembly and is connected thereto, for example, by splines or the like. The stub shaft 47 extends outwardly from the bearing assembly and into the magnetic brake described hereinafter. The stub shaft 47 extends from the bearing assembly outwardly along the axis of the shaft 15 through a mounting plate 50 which is in turn affixed to the chassis A by means such as the frame mounting member 13 which furnishes support for the plate 50. The plate 50 defines an opening therethrough symmetrical with respect to the axis of the shaft 15 to allow passage of the stub shaft 47 beyond the plate 50 and into the magnetic brake assembly. The magnetic brake assembly is of the type well known to the art which includes a brake face plate 52 that is rotatable with respect to the brake housing 53. Within the housing 53 are the conventional magnetic brake elements which include a magnetic coil which when energized attracts the brake face plate into engagement with the stationary portions of the brake assembly. Thus, when energized, the brake face plate is quickly stopped, if rotating, by the magnetic force of the brake assembly drawing it into firm engagement with stationary portions of the assembly. The brake face plate is in turn attached to the stub shaft 47. Accordingly, the stub shaft is free to rotate when the brake face plate 52 is free to rotate with respect to the brake assembly. In turn, the bearing assembly 41 is free to turn so long as the brake face plate is not engaged since the stub shaft is non-rotatable with respect to the bearing assembly. The yoke being connected to the bearing assembly is also free to rotate. It can be seen therefore that with the magnetic drum rotating, the shaft 15 also rotates. With the brake face plate 52 free to rotate with respect to the brake assembly, the movable head mounting means is free to rotate with the drum. Conversely, however, if the movable head mounting means is prevented from rotating, the magnetic drum is still free to rotate relative to the movable head mounting means since the end of the shaft 15 within the bearing assembly 41 is free to rotate with respect thereto. Rotation of the movable head mounting means is prevented when the brake assembly C is energized to attract the brake face plate into a non-rotatable condition.

Referring now to FIGURES 4 through 9, there is affixed to the movable head mounting means and specifically to the yoke arm 22 thereof a detent arm 60 adapted to engage the magnetic drum 14 by means of an indentation 61 formed at the periphery of the drum. That is, at the end of the drum adjacent the yoke arm 22, a longitudinally extending circular protrusion 55 is provided symmetrically about the axis of the shaft 15. An indentation having slightly sloping side surfaces 63 is formed in the periphery of the protrusion 55. Upon the side of the yoke arm adjacent to the drum, the detent arm 60 is pivotally affixed about a pivot point 64 on the yoke arm and extends from the yoke arm inwardly above the protrusion 55 on the drum such that the detent arm 60 is positioned above the peripheral surface of the protrusion at the end of the drum. A circular roller detent 65 is rotatably mounted on the detent arm 60 in the plane of the protrusion. The detent 65 is of such diameter that it is mateable with the indentation 61 and will rest in the indentation. The detent arm is spring loaded inwardly toward the axis of the drum. The spring loading is accomplished in the present embodiment by extending the detent arm beyond the detent 65 and affixing a spring 66 proximate the end thereof. The spring is a tension spring and is connected at its opposite end to a point on the chassis inwardly of the detent arm such that the spring force is exerted radially inwardly and normally urges the detent arm toward the drum surface about the pivot point 64. The detent 65, the indentation 61, and the spring force 66 are inter-dependent and are such that the detent will be urged into the indentation 61 by the spring 66 with sufficient force that the yoke will be carried with the drum during rotation of the drum until a sufficient force is applied to the yoke arm to cause the detent to be moved out of the indentation 61. That is, when both the movable head mounting means and the magnetic drum are free to rotate, the drum will rotate beneath the detent arm until the detent 65 engages the indentation. With the detent engaged, the movable head means will be rotated with the drum 14. If a braking force is applied to the movable head mounting means however, the detent will be disengaged and the drum is free to continue its rotation.

Referring now particularly to FIGURES 5 through 8, in the presently preferred embodiment of the present invention means are provided to raise the detent 65 to an inactive position, when recording commences, to prevent the noise caused by the detent striking the indentation as rotation of the drum continues. The detent arm 60 has at the first end thereof a bearing which is connected to the yoke arm 22 at the inner surface thereof by a pin or shaft for pivotal movement with respect to the arm at the pivot point 64. The detent is rotatably mounted and spaced from the inner surface of the detent arm in the plane of the protrusion 55 such that it is mateable with the indentation 61. Spaced forwardly along the detent arm and spaced from the detent 65 is a cam 67 extending from the inner surface of the detent arm and having a cam surface 67a. The cam, however, does not extend inward as far as the plane of the protrusion 55. Pivotally mounted on the yoke arm 22 at the inner surface thereof is a latch bar 80 to which is mounted at the outer surface thereof a cam engaging roller 81 positioned in the plane of the cam 67. At the opposite side of the latch bar 80, there is rotatably mounted a latch roller 82 in the plane of the detent 65 and indentation 61. Spring means 83 are provided to urge the latch bar counterclockwise in FIGURES 5 and 6 such that the latch roller 82 is urged in the opposite direction as the recording surface of the drum during recording operation. The latch bar is so suspended that the pivot arc of the latch roller together with the spring force will cause the latch roller 82 to only lightly engage the indentation 61 during forward rotation of the recording drum. When the direction of rotation of the drum is reversed, however, the latch bar is carried in the counter-clockwise direction by engagement of the latch roller 82 in the indentation 61 as shown in FIGURE 6. Thus, in operation, when the rotation of the yoke is stopped while rotation of the drum continues, the detent 65 is raised from the indentation to the position shown in FIGURE 5. The latch bar moves clockwise and the cam roller 81 moves under the cam 67 thus holding the detent arm 60 in the raised position with the detent 65 out of engagement with the indentation 61.

Referring now particularly to FIGURES 1 and 4, a second magnetic head mounting rack is positioned adjacent the surface of the drum at a position circumferentially spaced from the position of the first head mounting rack 40. The second head mounting rack 70 is stationary and is so constructed that it will position a plurality of magnetic heads in the same channels as the heads carried by the movable mounting rack 40. The second head mounting rack is again a plurality of arcuate members connected at the ends thereof and adapted to receive between each of the arcuate members a magnetic head 71 which is pivotally mounted and normally urged into engagement with the surface of the magnetic drum such that it will read from, or record upon, the magnetic tape being carried by the drum. Disengagement means 73 are provided to hold the heads out of engagement with the drum when desired. A bumper surface 72 is provided at the upper end of the second head mounting rack to limit the amount of arcuate travel possible by the movable heading mounting means. Thus, in the embodiment shown, the movable head mounting means is rotatable with respect to the axis of the shaft 15 from a position shown in FIGURE 4 to the position at which it engages or comes into contact with the bumper surface 72 of the second head mounting rack 70.

In operation, therefore, in order to clarify the operation of the device of the present invention and again considering seismic exploration as the present application of the invention, the drum 14 bearing a magnetic recording tape upon the surface thereof is rotating in the counter-clockwise position with reference to FIGURE 4. The magnetic heads 10 positioned in the mounting rack 40 of the movable head mounting means are recording heads, each adapted to record a signal received by the head in the respective channel of the magnetic tape. Appropriate circuitry well known to the art is connected to each of the heads such that an electrical signal received by a head will be recorded in the respective recording channel for that head as the magnetic tape moves beneath the head 10. In the second or stationary head mounting rack 70, the magnetic heads utilized are reading heads and are connected with appropriate circuitry to transmit from the head an electrical signal which is detected by the head in its respective channel. Thus, when the heads are operative, and the magnetic tape is moving beneath the recording heads 10, a given head 10 will record a signal received by it in its respective channel. At some subsequent time, that same signal will be detected by the reading head 71 in the respective channel and will be transmitted from the reading head 71 for recordation or reproduction. It is to be understood that the reading operation is not an essential feature of the present invention, but is illustrative of the utility of the invention. It can be seen further that no signal will be recorded upon the magnetic tape so long as the tape is not rotated beneath the recording head 10.

Thus, in operation in the recordation of a plurality of seismic signals, the signals are transmitted from a detector group to a respective recording head 10 in the respective channel of the multi-channel tape 17. At the commencement of the recording cycle, the movable head mounting means is in the clockwise position of FIGURE 4. At this position, the detent 65 is held within the indentation 61 such that rotation of the drum will cause the head mounting means to rotate with the drum with no relative movement between the recording head and the magnetic tape surface. The recording cycle is commenced by a first event as, for example, the commencement of the field tape recording. It is preferable that the first event should occur at a time sufficiently earlier than the fiducial time ($T=0$) of the record to allow the drum 14 to attain its proper recording speed. In the presently preferred embodiment, it has been found that less than 35° is necessary for the drum to accurately attain its recording speed. The position of the head mounting means at the commencement of the recording cycle is shown schematically in FIGURE 2 in which it can be seen that the movable head mounting means is at the clockwise position of its travel relative to the chassis of the recording apparatus. The drum is to be rotated in the counter-clockwise direction. At the position of FIGURE 2 as can be seen by reference to FIGURES 4 and 2, the detent 65 is held within the indentation 61 such that when the drum begins its counter-clockwise rotation, it carries the mounting means with it in the counter-clockwise direction and there is no relative movement between the recording heads and the tape surface. Upon the occurrence of the second event which is to correspond to the fiducial time, or $T=0$, of the record being made, the signal is received at the brake assembly C. In the illustrative application of this device as previously described, the fiducial time signal is transmitted by a time-break signal in the time-break channel recorded by the up-hole detector. Upon receipt at the brake assembly of the fiducial time signal, the brake is energized causing the brake face plate 52 to be locked in contact with the stationary brake assembly. Upon the occurrence of this locking action, the stub shaft 47 becomes stationary as does the bearing assembly 41 and the yoke arm 22 causing the movable head mounting means to be stopped and held stationary substantially instantaneously. Upon this stopping action of the head mounting means, the drum 14 continues to rotate and the detent 65 is forced from the indentation 61. At this point, therefore, the drum and the magnetic recording tape carried thereby commences its rotation relative to the recording heads 10 in the mounting rack of the movable head mounting means and recordation of signals received by the heads 10 commences. At this point, the head mounting means is in the position shown schematically in FIGURE 3. This point at which the recording surface commences its movement beneath the recording heads is the $T=0$ time of the recording being made. It can be readily seen, therefore, that the apparatus can be reset for the recordation of the next series of information and since the record will not commence until the occurrence of a second event which is comparable to the occurrence of the second event in the previous record the two records will have the same $T=0$ time upon the recording medium regardless of the time lapse between the occurrence of the first event, i.e. the beginning of the tape and the occurrence of the second event, i.e. the occurrence of the time-break signal. In the apparatus shown, the signals after being recorded are read from the channels by the stationary reading heads 71 and transmitted for addition and visual recordation after which the tape passes beneath erasing heads located between the reading heads and the recording heads, but not shown in the figures. After passing beneath the erasing heads, the tape is clean and a second record can be produced thereon.

What is claimed is:

1. A time-scale recording apparatus comprising:
  (a) a movable recording medium;
  (b) a reproducing element of the type by means of which recordation of a signal is obtained when there is relative movement between said medium and said element;
  (c) means for interconnecting said element and said recording medium for movement of said element with said medium;
  (d) means for transmitting a reference signal to said apparatus;
  (e) means for disconnecting said element from movement with said recording medium upon receipt of said reference signal whereby relative movement between said medium and said reproducing element is obtained for recordation of the signal to be recorded.

2. A time-scale recording apparatus comprising:
  (a) a rotatable drum having a recording surface thereon;
  (b) a reproducing element of the type by means of which recordation of a signal is obtained upon relative movement of the drum surface and reproducing element;
  (c) means for mounting said reproducing element adjacent said drum surface;
  (d) means for connecting said mounting means to said drum for rotation therewith;
  (e) means for transmitting a reference time signal to said apparatus;
  (f) means for disconnecting said mounting means from said drum upon receipt of said reference signal whereby said drum rotates relative to said reproducing element.

3. An apparatus for recording a time-scale record of an input signal comprising:
  (a) an apparatus chassis;
  (b) a recording drum rotatably mounted on said chassis;
  (c) a recording element of the type by means of which recordation of a signal is obtained upon relative movement of the drum surface and recording element;
  (d) means for mounting said recording element adjacent said drum surface in recording position with respect thereto;
  (e) means for engaging said recording element and said drum for rotation of said recording element with said drum;
  (f) means for transmitting a reference signal to said apparatus;
  (g) means for disengaging said recording element from rotation with said drum and connecting said recording element to said stationary chassis upon receipt of said reference signal whereby said drum rotates relative to said recording element.

4. An apparatus for recording a time-scale record of an input signal comprising:
  (a) an apparatus chassis;
  (b) a recording drum mounted on said chassis for rotation with respect thereto;
  (c) a recording element of the type by means of which recordation of a signal is obtained upon relative movement of the drum surface and recording element;
  (d) means for mounting said recording element adjacent said drum surface in recording position with respect thereto;
  (e) means for releasably engaging said mounting means and said drum for rotation of said mounting means and recording element with said drum;
  (f) means for initiating rotation of said drum and mounting means upon receipt of a first reference signal at said apparatus;
  (g) means for releasing said engaging means and connecting said mounting means to said chassis upon receipt of a second reference signal subsequent in time to said first reference signal whereby said drum rotates relative to said recording element.

5. A time-scale recording apparatus comprising:
  (a) a movable magnetic recording medium;
  (b) a reproducing element of the type by means of which recordation of a signal is obtained when there is relative movement between said magnetic medium and said element;
  (c) means for interconnecting said element and said recording medium for movement of said element with said medium;
  (d) means for transmitting a reference signal to said apparatus;
  (e) means for disconnecting said element from movement with said recording medium upon receipt of said reference signal whereby relative movement between said medium and said reproducing element is obtained for recordation of the signal to be recorded.

6. A time-scale recording apparatus comprising:
  (a) a rotatable drum having a magnetic recording surface thereon;
  (b) a reproducing element of the type by means of which recordation of a signal is obtained upon relative movement of the magnetic drum surface and reproducing element;
  (c) means for mounting said reproducing element adjacent said magnetic drum surface;
  (d) means for connecting said mounting means to said drum for rotation therewith;
  (e) means for transmitting a reference time signal to said apparatus;
  (f) means for disconnecting said mounting means from said drum upon receipt of said reference signal whereby said drum rotates relative to said reproducing element.

7. An apparatus for recording a time-scale record of an input signal comprising:
  (a) an apparatus chassis;

(b) a rotating recording drum rotatably mounted on said chassis;

(c) a plurality of recording elements of the type by means of which recordation of a signal is obtained upon relative movement of the drum surface and recording element;

(d) means for mounting said recording elements adjacent said drum surface in recording position with respect thereto, said plurality being arranged in side-by-side relationship each in a respective recording channel of said recording drum;

(e) means for engaging said recording elements and said drum for rotation of said recording elements with said drum;

(f) means for transmitting a reference signal to said apparatus;

(g) means for disengaging said recording elements from rotation with said drum and connecting said recording elements to said stationary chassis upon receipt of said reference signal whereby said drum rotates relative to said recording element.

8. An apparatus for recording a time-scale record of an input signal comprising:

(a) an apparatus chassis;

(b) a recording drum mounted on said chassis for rotation with respect thereto;

(c) a plurality of recording elements of the type by means of which recordation of a signal is obtained upon relative movement of the drum surface and recording element;

(d) means for mounting said plurality of recording elements adjacent said drum surface in recording position with respect thereto, said plurality being arranged in side-by-side relationship each in a respectice recording channel of said recording drum;

(e) means for releasably engaging said mounting means and said drum for rotation of said mounting means and recording elements with said drum;

(f) means for initiating rotation of said drum and mounting means upon receipt of a first reference signal at said apparatus;

(g) means for releasing said engaging means and connecting said mounting means to said chassis upon receipt of a second reference signal subsequent in time to said first reference signal whereby said drum rotates relative to said recording elements.

9. An apparatus for recording a time-scale record of an input signal comprising:

(a) an apparatus chassis;

(b) a recording drum mounted on said chassis for rotation with respect thereto;

(c) a recording element of the type by means of which recordation of a signal is obtained upon relative movement of the drum surface and recording element;

(d) means for mounting said recording element adjacent said drum surface in recording position with respect thereto;

(e) means for releasably engaging said mounting means and said drum for rotation of said mounting means and recording element with said drum;

(f) means for initiating rotation of said drum and mounting means upon receipt of a first reference signal at said apparatus;

(g) electrically actuated means for releasing said engaging means and connecting said mounting means to said chassis upon receipt of a second reference signal subsequent in time to said first reference signal whereby said drum rotates relative to said recording element.

10. An apparatus for recording a time-scale record of an input signal comprising:

(a) an apparatus chassis;

(b) a recording drum mounted on said chassis for rotation with respect thereto;

(c) a recording element of the type by means of which recordation of a signal is obtained upon relative movement of the drum surface and recording element;

(d) means for mounting said recording element adjacent said drum surface in recording position with respect thereto;

(e) means for releasably engaging said mounting means and said drum for rotation of said mounting means and recording element with said drum;

(f) means for initiating rotation of said drum and mounting means upon receipt of a first reference signal at said apparatus;

(g) an electrically actuated magnetic brake mounted on said chassis and interconnected to said recording element mounting means such that said recording element mounting means is free to rotate with said drum in the non-actuated condition of said brake, said brake being actuated upon receipt of a second reference signal subsequent in time to said first reference signal; and (h) means for releasing said engaging means and connecting said mounting means to said brake upon actuation of said brake in response to said second signal whereby said drum rotates relative to said recording element.

11. An apparatus for recording a time-scale record of an input signal comprising:

(a) an apparatus chassis;

(b) a recording drum mounted on said chassis for rotation with respect thereto;

(c) a recording element of the type by means of which recordation of a signal is obtained upon relative movement of the drum surface and recording element;

(d) means for mounting said recording element adjacent said drum surface in recording position with respect thereto; said mounting means including a yoke rotatably mounted upon said chassis for rotation about the centerline of the drum, an element mounting portion extending transversely with respect to said drum surface;

(e) means for releasably engaging said mounting means and said drum for rotation of said mounting means and recording element with said drum;

(f) means for initiating rotation of said drum and mounting means upon receipt of a first reference signal at said apparatus;

(g) means for releasing said engaging means and connecting said mounting means to said chassis upon receipt of a second reference signal subsequent in time to said first reference signal whereby said drum rotates relative to said recording element.

12. An apparatus for recording a time-scale record of an input signal comprising:

(a) an apparatus chassis;

(b) a recording drum mounted on said chassis for rotation with respect thereto;

(c) a recording element of the type by means of which recordation of a signal is obtained upon relative movement of the drum surface and recording element;

(d) means for mounting said recording element adjacent said drum surface in recording position with respect thereto;

(e) detent means for releasably engaging said mounting means and said drum for rotation of said mounting means and recording element with said drum;

(f) means for initiating rotation of said drum and mounting means upon receipt of a first reference signal at said apparatus;

(g) means for releasing said detent means and connecting said mounting means to said chassis upon receipt of a second reference signal subsequent in time to said first reference signal whereby said drum rotates relative to said recording element.

13. An apparatus for recording a time-scale record of an input signal comprising:
 (a) an apparatus chassis;
 (b) a recording drum mounted on said chassis for rotation with respect thereto;
 (c) a recording element of the type by means of which recordation of a signal is obtained upon relative movement of the drum surface and recording element;
 (d) means for mounting said recording element adjacent said drum surface in recording position with respect thereto; said mounting means including a yoke rotatably mounted upon said chassis for rotation about the centerline of the drum, an element mounting portion extending transversely with respect to said drum surface;
 (e) detent means for releasably engaging said mounting means and said drum for rotation of said mounting means and recording element with said drum;
 (f) means for initiating rotation of said drum and mounting means upon receipt of a first reference signal at said apparatus;
 (g) means for releasing said detent means and connecting said mounting means to said chassis upon receipt of a second reference signal subsequent in time to said first reference signal whereby said drum rotates relative to said recording element.

14. An apparatus for recording a time-scale record of an input signal comprising:
 (a) an apparatus chassis;
 (b) a recording drum mounted on said chassis for rotation with respect thereto;
 (c) a recording element of the type by means of which recordation of a signal is obtained upon relative movement of the drum surface and recording element;
 (d) means for mounting said recording element adjacent said drum surface in recording position with respect thereto; said mounting means including a yoke rotatably mounted upon said chassis for rotation about the centerline of the drum, an element mounting portion extending transversely with respect to said drum surface;
 (e) detent means for releasably engaging said mounting means and said drum for rotation of said mounting means and recording element with said drum;
 (f) means for initiating rotation of said drum and mounting means upon receipt of a first reference signal at said apparatus;
 (g) an electrically actuated magnetic brake mounted on said chassis and interconnected to said recording element mounting means such that said recording element mounting means is free to rotate with said drum in the non-actuated condition of said brake, said brake being actuated upon receipt of a second reference signal subsequent in time to said first reference signal; and
 (h) means for releasing said detent means and connecting said mounting means to said brake upon actuation of said brake in response to said second signal whereby said drum rotates relative to said recording element.

15. An apparatus for recording a time-scale record of an input signal comprising:
 (a) an apparatus chassis;
 (b) a recording drum mounted on said chassis for rotation with respect thereto;
 (c) a plurality of recording elements of the type by means of which recordation of a signal is obtained upon relative movement of the drum surface and recording element;
 (d) means for mounting said plurality of recording elements adjacent said drum surface in recording position with respect thereto, said plurality being arranged in side-by-side relationship each in a respective recording channel of said recording drum; said means including a yoke mounted upon said chassis for rotation about the centerline of said drum, a recording element mounting portion extending transversely with respect to said drum surface;
 (e) means for releasably engaging said mounting means and said drum for rotation of said mounting means and recording elements with said drum;
 (f) means for initiating rotation of said drum and mounting means upon receipt of a first reference signal at said apparatus;
 (g) means for releasing said engaging means and connecting said mounting means to said chassis upon receipt of a second reference signal subsequent in time to said first reference signal whereby said drum rotates relative to said recording elements.

16. An apparatus for recording a time-scale record of an input signal comprising:
 (a) an apparatus chassis;
 (b) a recording drum mounted on said chassis for rotation with respect thereto;
 (c) a plurality of recording elements of the type by means of which recordation of a signal is obtained upon relative movement of the drum surface and recording element;
 (d) means for mounting said plurality of recording elements adjacent said drum surface in recording position with respect thereto, said plurality being arranged in side-by-side relationship each in a respective recording channel of said recording drum, said means including a yoke mounted upon said chassis for rotation about the centerline of said drum, a recording element mounting portion extending transversely with respect to said drum surface;
 (e) detent means for releasably engaging said mounting means and said drum for rotation of said mounting means and recording elements with said drum;
 (f) means for initiating rotation of said drum and mounting means upon receipt of a first reference signal at said apparatus;
 (g) an electrically actuated magnetic brake mounted on said chassis and interconnected to said recording element mounting means such that said recording element mounting means is free to rotate with said drum in the non-actuated condition of said brake, said brake being actuated upon receipt of a second reference signal subsequent in time to said first reference signal; and
 (h) means for releasing said detent means and connecting said mounting means to said brake upon actuation of said brake in response to said second signal whereby said drum rotates relative to said recording element.

No references cited.